United States Patent
Barnes et al.

(10) Patent No.: US 6,942,083 B2
(45) Date of Patent: Sep. 13, 2005

(54) VISCOUS FAN CLUTCH ACTUATED BY A HEATING ELEMENT AND AMBIENT AIR

(75) Inventors: Jon Barnes, Royal Oak, MI (US); Diana D. Brehob, Dearborn, MI (US); Todd Kappauf, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 164 days.

(21) Appl. No.: 10/636,096

(22) Filed: Aug. 7, 2003

(65) Prior Publication Data

US 2005/0029070 A1 Feb. 10, 2005

(51) Int. Cl.[7] ................................. F16D 35/02
(52) U.S. Cl. ................ 192/58.62; 192/58.66; 192/58.681; 192/82 T
(58) Field of Search .................... 192/58.62, 58.63, 192/58.64, 58.65, 58.66, 58.68, 58.681, 58.682, 192/82 T

(56) References Cited

U.S. PATENT DOCUMENTS

| | | | |
|---|---|---|---|
| 4,040,304 A | | 8/1977 | McCabe |
| 4,108,424 A | | 8/1978 | Rizzo |
| 4,271,945 A | | 6/1981 | Budinski |
| 4,310,084 A | * | 1/1982 | Nonnenmann ........... 192/58.61 |
| 4,351,426 A | | 9/1982 | Bopp |
| 4,550,695 A | * | 11/1985 | Kikuchi et al. .......... 123/41.12 |
| 4,650,045 A | * | 3/1987 | Weible et al. ........... 192/58.61 |
| 5,799,765 A | * | 9/1998 | Ono et al. ................ 192/58.62 |

FOREIGN PATENT DOCUMENTS

JP 2001027260 A * 1/2001 ........... F16D 35/02

* cited by examiner

*Primary Examiner*—Richard M. Lorence
(74) *Attorney, Agent, or Firm*—Diana D. Brehob

(57) ABSTRACT

A fan apparatus is disclosed which includes a fan coupled to a drive mechanism via a viscous clutch. The viscous clutch includes a drive chamber containing a hydraulic fluid with an amount of hydraulic fluid in the drive chamber being related to a torque transmitted from said drive mechanism to the fan; a valve coupled to the drive chamber controlling flow of hydraulic fluid into the drive chamber; a bimetallic strip coupled to the valve; and a heating element coupled to the viscous clutch close to the bimetallic strip. The bimetallic strip is located in a position open to ambient air.

31 Claims, 1 Drawing Sheet

Figure 1
Figure 2
Figure 3
Figure 4
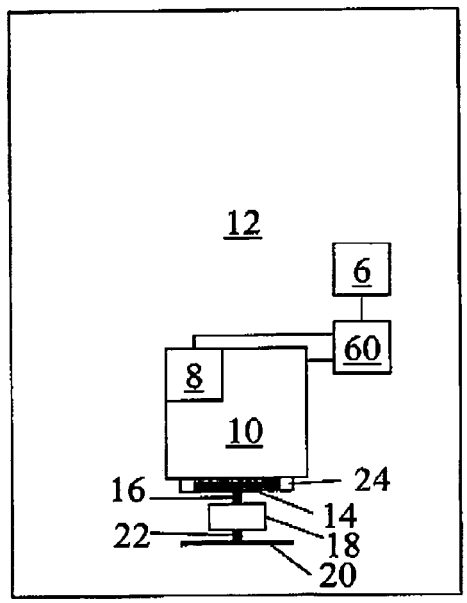
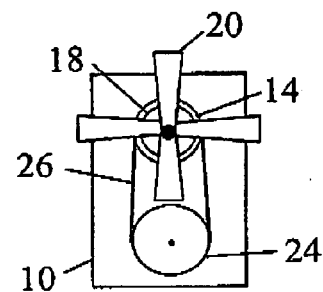
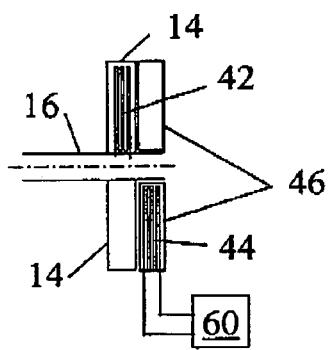

VISCOUS FAN CLUTCH ACTUATED BY A HEATING ELEMENT AND AMBIENT AIR

FIELD OF THE INVENTION

The present invention pertains to a viscous clutch disposed between an internal combustion engine and a cooling fan, and more particularly, to a method and apparatus to control the actuation of the viscous clutch.

BACKGROUND OF THE INVENTION

It is well known in the art to use a fan to provide cooling to an internal combustion engine. The fan is typically driven by a belt connected to a pulley on the engine. It is also known to employ a viscous clutch between the fan's pulley, which receives drive power from the engine, and output of the clutch coupled to the fan.

A typical system is shown in FIG. 1. An engine 10 is disposed in a vehicle 12. On the front of engine is a pulley (not visible in FIG. 1) which drives a second pulley 14. Pulley 14 is coupled to a shaft 16. Shaft 16 is coupled to a viscous clutch 18. Fan 20 is affixed to viscous clutch 18.

A front view of engine 10 is shown in FIG. 2 in which pulley 24, which is affixed to the crankshaft of the engine, is coupled to pulley 14 via belt 26. Pulley 16 is coupled to viscous clutch 14, which is in turn coupled to fan 20.

A detail of the viscous clutch 18 is shown in FIG. 3. Input shaft 16 to clutch 18 is coupled to plate 30. Output shaft 22 is coupled to plate 32. When the space between plates 30 and 32 is filled with a liquid, e.g., hydraulic fluid, shaft 22 is caused to rotate at a speed somewhat less than the rotational speed of shaft 16, such speed of shaft 22 depending on speed of shaft 16, viscosity of the fluid and other parameters. When the space contains little or no liquid, shaft 22 rotates at a much slower speed than shaft 16. Viscous clutch 18 contains a storage reservoir 28 containing a hydraulic fluid. The space in between plates 30 and 32 is called a drive chamber. There is a valve (not shown) between storage reservoir 28 and the drive chamber. In one example, the valve is an orifice that can be occluded or not by a plate. In a second example, the valve is an orifice that can be occluded by a pin. When the valve is open, hydraulic fluid from the storage reservoir is forced through the valve orifice into the drive chamber, thereby filling the space between plates 30 and 32. Typically, plates 30 and 32 have annular ridges on their surfaces to inhibit the hydraulic fluid movement toward the outside edges and to increase surface area for more torque capacity due to the shear force of the hydraulic fluid. Hydraulic fluid returns to storage chamber 28 through a passageway, not shown. When the valve is open, hydraulic fluid is continually flowing through the circuit described: storage chamber 28, through the valve to the drive chamber (between plates 30 and 32), and back to storage chamber 28 through the passageway.

The opening and closing of the valve is controlled by a bimetallic strip coupled to the valve. One example is a bimetallic coil made with metals of dissimilar expansion coefficients. When the temperature of the coil changes, the coil either coils further or becomes uncoiled, depending on whether the metal with the higher expansion coefficient is on the outside or inside surface of the bimetallic coil. When the bimetallic coil is connected to a small plate that can occlude the valve's orifice, then, the amount of the valve orifice occlusion is a function of how much the bimetallic coil is coiled up, and hence a function of the temperature. In another example, the bimetallic strip is a strip which changes from flat to cupped when it is heated. When the strip becomes heated, it can depress a pin in the valve to cause the valve to open. The bimetallic strip/valve system can be designed to an on-off or fully variable device.

In the prior art, the bimetallic strip is exposed to under-hood air. As the under-hood temperature changes, the bimetallic strip changes shape and changes the position of the valve coupled to the drive chamber and, hence, the amount of fluid in the drive chamber.

In U.S. Pat. No. 4,351,426, a heater is disposed next to the bimetallic strip so that by controlling the current or voltage applied to the heater, the state of the bimetallic strip, and hence the valve opening position, can be controlled. In '426, the bimetallic strip and heating element are enclosed at the back of the viscous clutch. The inventor of the present invention has recognized a disadvantage in such a configuration.

SUMMARY OF THE INVENTION

The inventor of the present invention has recognized a new arrangement for controlling flow into the drive chamber of viscous clutch.

To overcome deficiencies in prior art approaches, a fan apparatus including a fan coupled to a drive mechanism via a viscous clutch is disclosed. The viscous clutch further includes a drive chamber containing a hydraulic fluid. The amount of hydraulic fluid in the drive chamber is related to torque transmitted from the drive mechanism to the fan. The clutch further includes a valve coupled to the drive chamber controlling flow of hydraulic fluid into the drive chamber and a bimetallic strip coupled to the valve. The bimetallic strip moves the valve to a more open position when the temperature of the bimetallic strip increases, thereby increasing the amount of hydraulic fluid supplied to the drive chamber. The clutch also includes a heating element coupled to the viscous clutch in close proximity to, or attached to, the bimetallic strip. Further, the bimetallic strip is located in a position open to ambient air. The drive mechanism is an internal combustion engine and the ambient air is the air flowing in and around the engine, in the under-hood engine compartment.

The heating element is electronically coupled to an electronic control unit and is supplied current based on sensors coupled to the electronic control unit providing such information as coolant temperature, oil temperature, engine speed, vehicle speed, and engine torque. The current is supplied via a slip ring or an inductive coupling. The electronic control unit is capable of detecting an open circuit to the heating element. If such a condition is determined a code in memory is set.

The clutch further includes an input shaft coupled to the drive mechanism via a pulley and an output shaft coupled to the fan. The input shaft is coupled to a first plate and the output shaft is coupled to a second plate. The volume in between the plates is the drive chamber. The amount of torque transmitted from the first plate to the second plate depends on the viscosity and amount of fluid contained between the plates.

In one embodiment, the bimetallic element is a flat strip. Alternatively, the bimetallic element is a coil. The bimetallic element changes shape as a function of temperature change. The bimetallic element is coupled to the valve and arranged so that the valve is moved toward a more open position when temperature of the bimetallic element rises.

An advantage of the present invention is that the bimetallic strip is in communication with both the heating element and the under-hood air meaning that control of the bimetallic strip is modified or controlled by both. If a break in the circuit to the heating element occurs, the bimetallic strip is still actuated when the under-hood temperature rises above a predetermined temperature, i.e., the set point of the bimetallic strip, thereby avoiding engine overheating. In other words, the heating element is not the solely controlling the viscous fan clutch—the under-hood air temperature also controls.

Yet another advantage of the present invention is that engine parameters, such as coolant temperature, oil temperature, engine speed, or any other parameters measured or inferred in the engine control unit can be used to control the current supply to the heater strip, thereby causing control of the viscous clutch's valve to be based on more information than simply under-hood temperature. In this way, control of the fan is tailored to be more accurate to meet the desired cooling.

Another advantage provided by the present invention is that the fuel economy of the vehicle is improved by providing the appropriate cooling level to the engine. When the engine is overcooled, the engine oil is brought to a cooler temperature than optimal and the oil is more viscous. When the oil is more viscous than necessary, the shear force in creating relative movement between engine parts, e.g., pistons reciprocating in engine cylinders, is higher than need be thereby consuming extra fuel. The present invention alleviates overcooling. In addition, by allowing overall lower fan speeds, the fan consumes less engine power, thereby decreasing fuel consumption.

BRIEF DESCRIPTION OF THE DRAWINGS

The advantages described herein will be more fully understood by reading an example of an embodiment in which the invention is used to advantage, referred to herein as the Detailed Description, with reference to the drawings wherein:

FIG. 1 is a schematic of an automotive vehicle with an internal combustion engine and a fan coupled to the engine via a viscous clutch;

FIG. 2 is a schematic of a front view of an internal combustion engine of an internal combustion engine showing pulleys, a belt and a fan;

FIG. 3 is a schematic of a viscous clutch according to an aspect of the present invention; and FIG. 4 is a cross-section of the inductive coupling.

DETAILED DESCRIPTION OF THE INVENTION

An internal combustion engine 10 is shown disposed in an automotive vehicle 12 is shown in FIG. 1. At the front of the engine are two pulleys 14 and 24. Pulley 14 is coupled to a shaft 16, the input shaft to viscous clutch 18. Viscous clutch 18 has an output shaft 22 coupled to fan 20 which forces air to flow across engine 10 to provide cooling. Engine 10 has one or more sensors 6, 8 connected to it for measuring such quantities as: engine coolant temperature, engine oil temperature, engine speed, barometric pressure, ambient temperature, EGR flow rate, as examples. The output of the engine sensors is communicated to engine control unit 60.

Referring to FIG. 2, a front view of the engine is shown in which the relationship between pulleys 14 and 24 is more clearly shown. Pulley 24 is coupled to the crankshaft of engine 10. Typically, pulley 14 is coupled to a water pump. Alternatively, pulley 14 is coupled to engine camshafts or other engine component. Pulley 14 is belt 26 driven by pulley 24. Alternatively, element 26 is a chain. In FIG. 2, pulley 24 is shown with a larger diameter than pulley 14. Alternatively, pulley 24 has a smaller diameter than pulley 14. Also shown in FIG. 2 is fan 20.

Shown in FIG. 3 is a detail of the viscous clutch 18 according to the present invention. Input shaft 16 of clutch 18 is coupled to plate 30; output shaft 22 is coupled to plate 32. The amount of torque transmitted between input shaft 16 and output shaft 22 is the amount of fluid that is contained between plates 30 and 32. If the volume between the plates is nearly full of fluid, shaft 22 rotates at nearly the same speed as shaft 16, unless shaft 16 is rotating at very high speed. When there is little fluid in the volume between plates 30 and 32, shaft 22 is nearly stationary, being hardly affected by the speed of shaft 16. In the present invention, a heating element 38 is placed in the vicinity of the bimetallic strip 36. When additional cooling is desired, current is caused to flow to heating element 38, which causes bimetallic strip 36 to open a valve 35 thereby allowing more fluid to flow in between plates 30 and 32, which in turn causes the fan to rotate at a higher speed. The current is provided through slip rings 34, rotating electrical connecting device and wires 40 which connect to heating element 38. Engine control unit 60 is connected directly to the slip rings 34 to provide a controlled current supply to the heating element 38. Alternatively, engine control unit 60 supplies a signal to an intermediary device to control the current supplied to the heating element 38.

In an alternative embodiment, the current flow to the heating element 38 is supplied inductively, as shown in FIG. 4. Coil 44 is the stationary coil mounted to a nonrotating element 46 or mounting surface. Element 46 is a water pump housing, a surface of the engine, or other nonrotating part. In FIG. 4, rotating coil 42 is mounted to pulley 14. Alternatively, coil 42 is mounted to any element rotating at the same speed as and concentrically with shaft 16, which is the input shaft to viscous clutch 18. By causing current to flow through stationary coil 44 an alternating current is induced in rotating coil 42. Coil 42 is electrically connected to heating element 38 along shaft 16, (electrical connection not shown). Electronic control unit 60 controls the current in stationary coil 44, thereby adjusting current induced in rotating coil 12, thereby controlling the amount of heating provided by heating element 38.

In the prior art, the bimetallic strip temperature is affected by the air flowing in and around it and the temperature of the material in which it is in contact. This approximates engine temperature poorly, as it is an inference based on underhood temperature, which is influenced by the air flowing through the radiator and/or condenser into the engine compartment, surface temperature of underhood components, etc. If, for example, temperature A is the temperature at which the bimetallic strip opens the valve 35 to cause the fan to increase engine cooling in the average situation, to protect for a worst case scenario, that temperature of opening the valve 35 is set to a temperature less than temperature A. This results in running the fan more often than desired, thus providing more cooling than necessary, in most situations simply to protect against the unusual situation.

In the '426 prior art, the bimetallic strip is provided with a heating element connected to a microprocessor. The microprocessor sends a control signal to the heating element, based on input from the engine coolant temperature sensor. The control signal is a binary on/off signal to the heating element, which modifies the shape of an actuating disk into either a concave or convex position. However, this configuration allows no fail safe for a break in the electrical connection. If the electrical connection is severed, the actuating disk cannot be modified to provide increased fan speed, thus the engine is susceptible to an overheat condition. It also does not allow for modulation of the opening in the orifice for the hydraulic fluid path from the storage chamber to the drive chamber, thus degrading its ability to modulate fan speed, and thus airflow, for increased control of cooling performance and fuel economy.

In the present invention the bimetallic strip is placed in the presence of under-hood air flow so that if the connection to the heating element becomes an open circuit or other anomalous condition occurs, the bimetallic strip continues to function based on the under-hood air flow providing satisfactory, albeit less than optimized, control of the cooling provided by the fan. Further, when the heating element is operating properly, the control is based on at least one of: engine coolant temperature, engine oil temperature, under-hood temperature, and engine operating condition in addition to the influence of under-hood air temperature flowing by the bimetallic strip.

While several modes for carrying out the invention have been described in detail, those familiar with the art to which this invention relates will recognize alternative designs and embodiments for practicing the invention. The above-described embodiments are intended to be illustrative of the invention, which may be modified within the scope of the following claims.

What is claimed is:

1. A fan apparatus, comprising:
  a fan coupled to a drive mechanism via a viscous clutch, said viscous clutch further comprising:
    a drive chamber containing a hydraulic fluid, an amount of hydraulic fluid in the drive chamber being related to a torque transmitted from said drive mechanism to said fan;
    a valve coupled to said drive chamber controlling flow of hydraulic fluid into said drive chamber;
    a bimetallic strip coupled to said valve, said bimetallic strip moving said valve to a more open position when a temperature of the bimetallic strip increases, thereby increasing said amount of hydraulic fluid supplied to said drive chamber; and
    a heating element coupled to said viscous clutch in close proximity to said bimetallic strip wherein said bimetallic strip is located in a position open to ambient air wherein said heating element is supplied electrical current through a slip ring arrangement on said viscous clutch.

2. The fan apparatus of claim 1 wherein said drive mechanism is an internal combustion engine, said internal combustion engine and said fan apparatus are disposed in an automobile within an engine compartment of said automobile.

3. The fan apparatus of claim 2 wherein is said ambient air is air within said engine compartment.

4. The fan apparatus of claim 3, further comprising: an electronic control unit electronically coupled to said heating element and said engine.

5. The fan apparatus of claim 4 wherein said electronic control unit is electronically coupled to at least one of: an engine coolant temperature sensor disposed in engine coolant within said engine, an under hood temperature sensor disposed under the hood of said engine, an ambient air temperature sensor providing measure of air temperature outside said automobile, an engine speed sensor providing a measure of engine rotational speed, and an accelerator pedal position sensor providing a measure of operator demanded power.

6. The fan apparatus of claim 4 wherein said electronic control unit adjusts current to said heating element based on signals from engine sensors.

7. The fan apparatus of claim 4 wherein said electronic control unit causes current to said heating element to increase when additional engine cooling is determined.

8. The fan apparatus of claim 4 wherein said electronic control unit causes current to said heating element to decrease when engine cooling is determined.

9. The fan apparatus of claim 2, further comprising:
  a pulley which is belt driven by said engine; and
  an output shaft of said pulley is connected to an input shaft of said viscous clutch.

10. The apparatus of claim 9, said viscous clutch further comprising: an output shaft coupled to said fan.

11. The apparatus of claim 10 wherein said input shaft is coupled to a first plate and said output shaft is coupled to a second plate and the space in between said first and second plates is said drive chamber.

12. The apparatus of claim 10, said viscous clutch further comprising: a secondary chamber for holding hydraulic fluid.

13. A fan apparatus, comprising:
  a fan coupled to a drive mechanism via a viscous clutch, said viscous clutch further comprising:
    a drive chamber containing a hydraulic fluid, an amount of hydraulic fluid in the drive chamber being related to a torque transmitted from said drive mechanism to said fan;
    a valve coupled to said drive chamber controlling flow of hydraulic fluid into said drive chamber;
    a bimetallic strip coupled to said valve, said bimetallic strip moving said valve to a more open position when a temperature of the bimetallic strip increases, thereby increasing said amount of hydraulic fluid supplied to said drive chamber;
    a heating element coupled to said viscous clutch in close proximity to said bimetallic strip wherein said bimetallic strip is located in a position open to ambient air;
  rotating coil coupled to said heating element;
  a stationary coil proximate to a pulley coupled to said viscous clutch; and
  an electronic control unit electrically coupled to said stationary coil, said electronic control unit controls the flow of current through said stationary coil thereby inducing current flow through said rotating coil and through said heating element.

14. The apparatus of claim 13 wherein said drive mechanism is an internal combustion engine, said internal combustion engine and said fan apparatus are disposed in an automobile within an engine compartment of said automobile and said electronic control unit bases current flow through said coil on said engine based on at least one of: engine coolant temperature, underhood temperature, engine speed, vehicle speed, oil temperature, and operator demanded power.

15. A method for adjusting a rotational speed of an automotive cooling fan, the cooling fan being coupled to an engine via a viscous clutch, comprising:
  adjusting a current flow to a heating element coupled to a bimetallic strip coupled to said viscous clutch wherein said bimetallic strip is proximate to flowing ambient air and a current flow to said heating element is supplied inductively.

16. The method of claim 15 wherein said current flow is adjusted based at least one of: engine coolant temperature, underhood temperature, ambient air temperature, engine speed, and operator demanded power.

17. The method of claim 15 wherein said bimetallic strip causes a valve in said viscous clutch toward an open position when a temperature of said bimetallic strip increases.

18. The method of claim 15 wherein said viscous clutch contains a fluid.

19. The method of claim 15 wherein a rotational speed of the fan is less than or equal to a rotational speed of the engine.

20. The method of claim 18 wherein the rotational speed of the fan is based on the rotational speed of the engine, a viscosity of said fluid contained in a drive chamber of said viscous clutch, and a quantity of said fluid contained in said drive chamber of said viscous clutch.

21. A fan apparatus, comprising:
a fan coupled to an internal combustion engine via a viscous clutch, said viscous clutch further comprising:
  a drive chamber containing a hydraulic fluid, an amount of torque transmitted from said drive mechanism to said fan being based on an amount of hydraulic fluid in said drive chamber;
  a valve coupled to said drive chamber controlling flow of hydraulic fluid into said drive chamber;
  a bimetallic strip coupled to said valve, said bimetallic strip moving said valve to a more open position when a temperature of the bimetallic strip increases, thereby increasing said amount of hydraulic fluid in the drive chamber; and
  a heating element coupled to said viscous clutch wherein said heating element is supplied current inductively.

22. The fan apparatus of claim 21, further comprising: an electronic control unit electronically coupled to said heating element and said engine wherein said electronic control unit is electronically coupled to and receives a signal from at least one of: an engine coolant temperature sensor disposed in engine coolant within said engine, an under hood temperature sensor disposed under the hood of said engine, an ambient air temperature sensor providing a measure of air temperature outside said automobile, an engine speed sensor providing a measure of engine rotational speed, and an accelerator pedal position sensor providing a measure of operator demanded power.

23. The fan apparatus of claim 22 wherein said electronic control unit causes current flow through said heating element to increase when a demand for additional cooling is determined.

24. The fan apparatus of claim 22 wherein said electronic control unit causes current flow through said heating element to decrease when a demand for less cooling is determined.

25. The fan apparatus of claim 21, further comprising:
a stationary coil mounted to a nonrotating element proximate said viscous clutch;
a rotating coil proximate said stationary coil; and
an electronic control unit electronically coupled to said heating element and said stationary coil wherein said electronic coil controls current flow in said stationary coil.

26. The fan apparatus of claim 25 wherein said electronic control unit electronically is electronically coupled to and receives a signal from at least one of: an engine coolant temperature sensor disposed in engine coolant within said engine, an under hood temperature sensor disposed under the hood of said engine, an ambient air temperature sensor providing a measure of air temperature outside said automobile, an engine speed sensor providing a measure of engine rotational speed, and an accelerator pedal position sensor providing a measure of operator demanded power.

27. The fan apparatus of claim 26 wherein said current flow in said stationary coil is based on at least one of an engine coolant temperature, an ambient air temperature, a engine rotational speed, and an accelerator pedal position.

28. The fan apparatus of claim 26 wherein said rotating coil is mounted on a pulley coupled to said engine.

29. The fan apparatus of claim 26 wherein said stationary coil is mounted on said engine.

30. The fan apparatus of claim 21 wherein positioning of said heating element and said bimetallic strip are such that a temperature of said bimetallic strip is significantly affected by both said heating element and by a temperature of air surrounding said engine.

31. A fan apparatus, comprising:
a fan coupled to an internal combustion engine via a viscous clutch, said viscous clutch further comprising:
  a drive chamber containing a hydraulic fluid, an amount of torque transmitted from said drive mechanism to said fan being based on an amount of hydraulic fluid in said drive chamber;
  a valve coupled to said drive chamber controlling flow of hydraulic fluid into said drive chamber;
  a bimetallic strip coupled to said valve, said bimetallic strip moving said valve to a more open position when a temperature of the bimetallic strip increases, thereby increasing said amount of hydraulic fluid in the drive chamber;
  a heating element coupled to said viscous clutch wherein positioning of said heating element and said bimetallic strip are such that a temperature of said bimetallic strip is significantly affected by both said heating element and by a temperature of air surrounding said engine; and
an electronic control unit electronically coupled to said heating element and said engine wherein said electronic control unit is electronically coupled to and receives a signal from at least one of: an engine coolant temperature sensor disposed in engine coolant within said engine, an under hood temperature sensor disposed under the hood of said engine, an ambient air temperature sensor providing a measure of air temperature outside said automobile, an engine speed sensor providing a measure of engine rotational speed, and an accelerator pedal position sensor providing a measure of operator demanded power and said electronic control unit detects an open circuit to said heating element and sets a code in memory indicating said open circuit.

* * * * *